Figure 1:
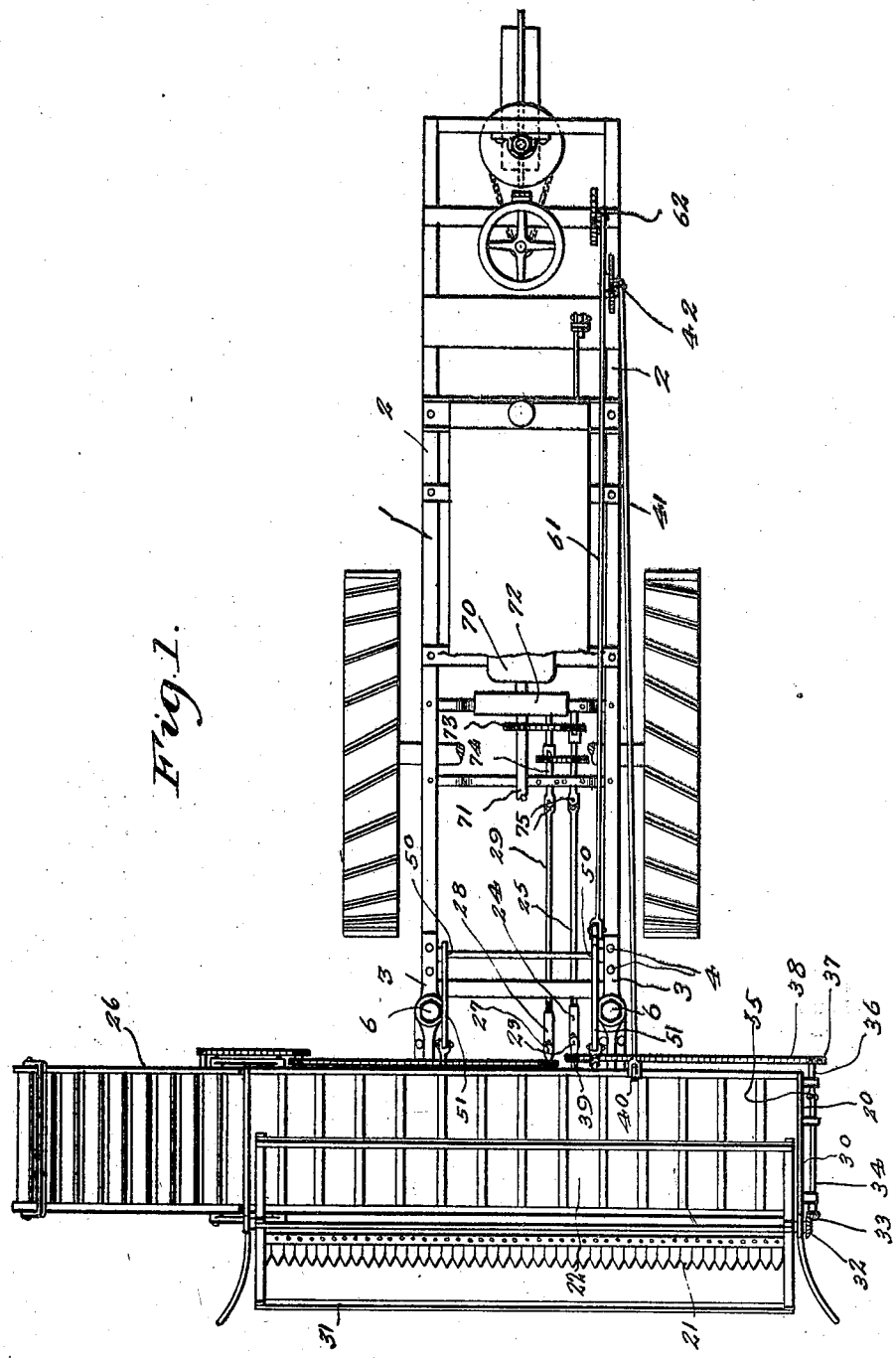

Mar. 6, 1923.
1,447,823.

C. O. THOMAS.
APPARATUS CARRYING ATTACHMENT FOR TRACTORS.
FILED AUG. 22, 1921.

3 SHEETS—SHEET 1.

Clay O. Thomas INVENTOR

BY *Victor J. Evans*

ATTORNEY

WITNESSES

Mar. 6, 1923.
C. O. THOMAS.
APPARATUS CARRYING ATTACHMENT FOR TRACTORS.
FILED AUG. 22, 1921.
1,447,823.
3 SHEETS—SHEET 2.
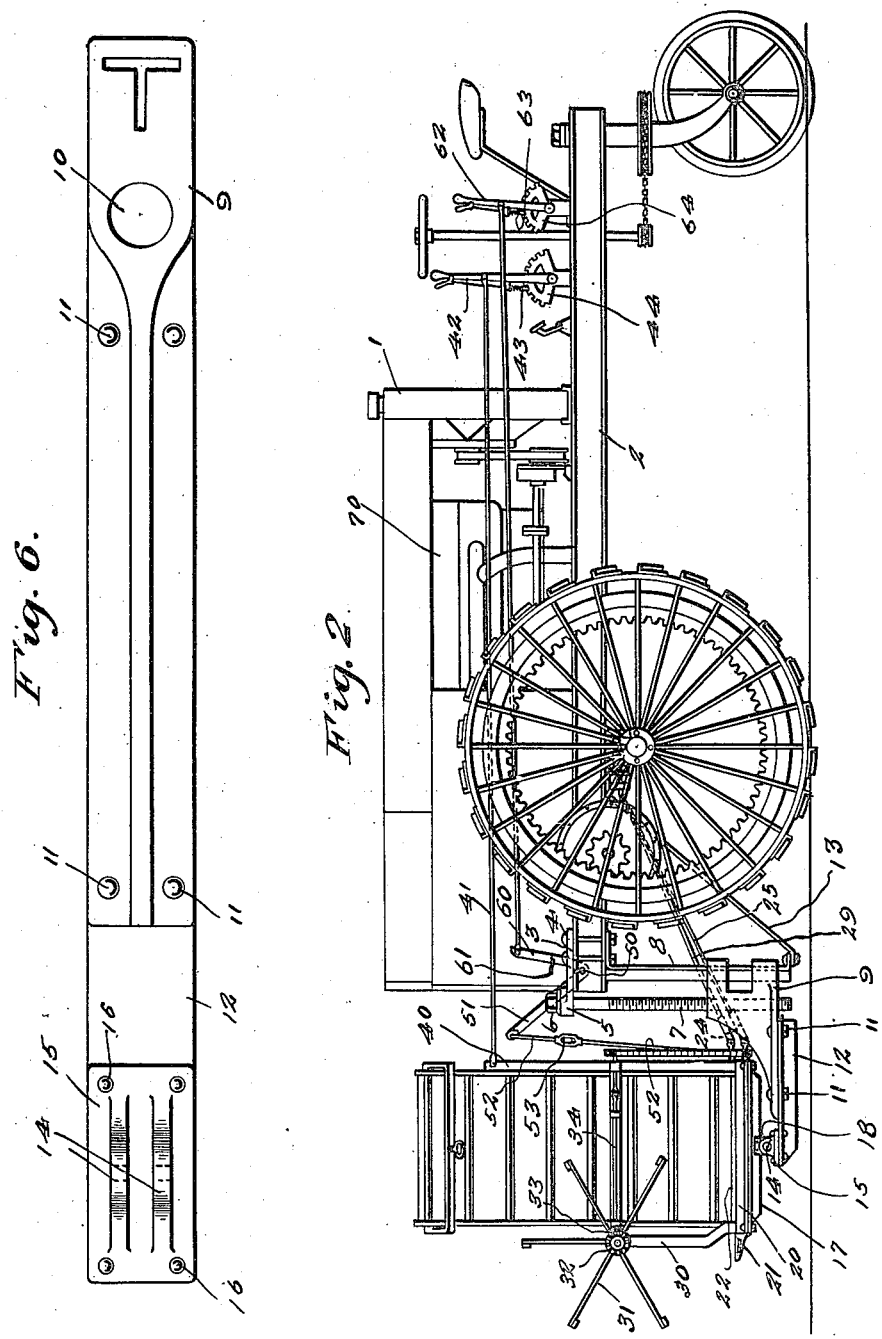

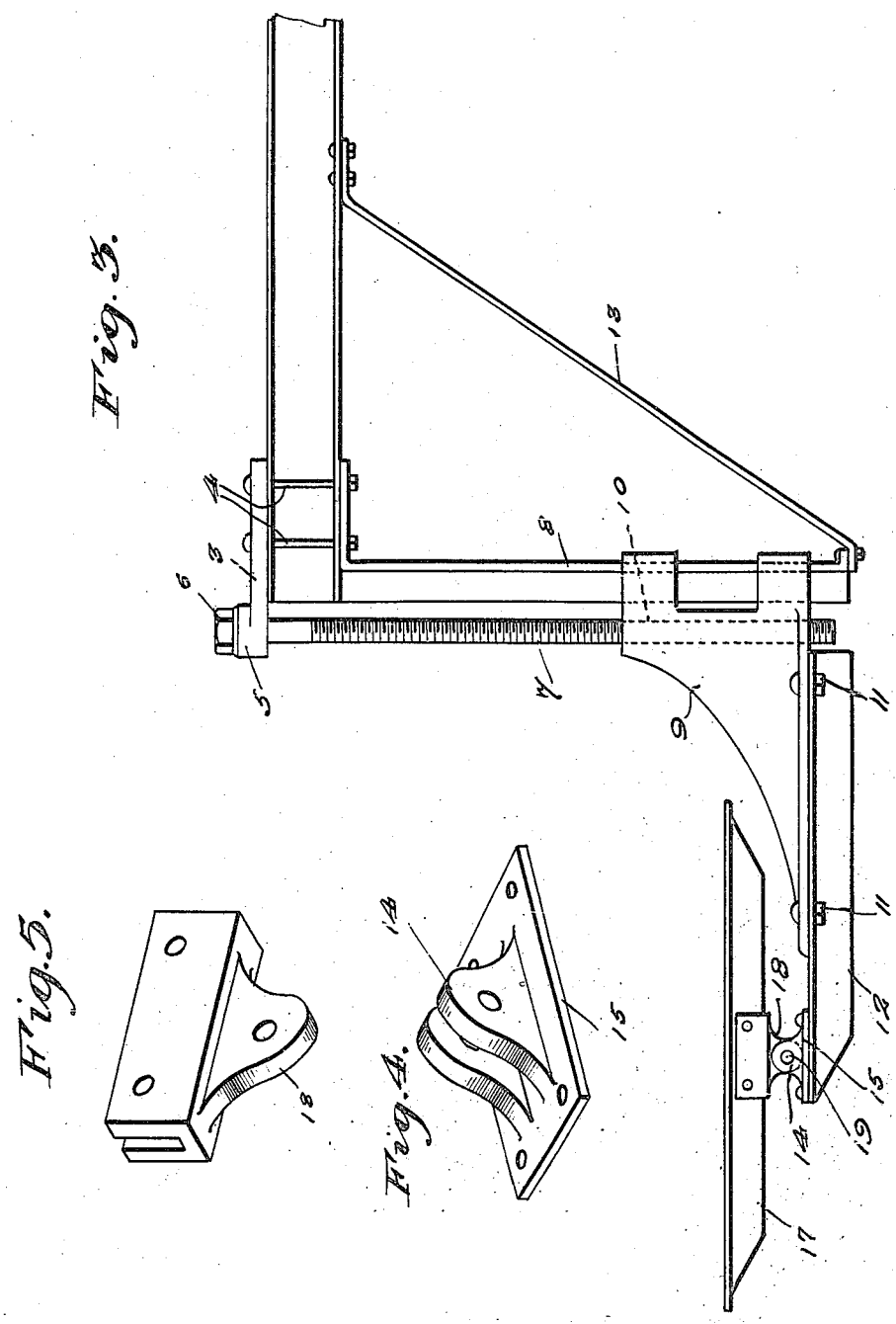

Patented Mar. 6, 1923.

1,447,823

UNITED STATES PATENT OFFICE.

CLAY O. THOMAS, OF COLORADO SPRINGS, COLORADO.

APPARATUS-CARRYING ATTACHMENT FOR TRACTORS.

Application filed August 22, 1921. Serial No. 494,260.

*To all whom it may concern:*

Be it known that I, CLAY O. THOMAS, a citizen of the United States, residing at Colorado Springs, in the county of El Paso and State of Colorado, have invented new and useful Improvements in Apparatus-Carrying Attachment for Tractors, of which the following is a specification.

The object of my present invention is the provision of a simple, strong and easily adjusted tractor attachment, designed to carry at the front of the tractor a grain header apparatus or any other apparatus to which the attachment is applicable.

To the attainment of the foregoing, the invention consists in the improvement as hereinafter described and definitely claimed.

In the accompanying drawings, forming part of this specification:—

Figure 1 is a plan view illustrating my novel attachment as carrying a grain header and as connected with a tractor.

Figure 2 is a side elevation of the same.

Figures 3, 4 and 5 and 6 are detail views of parts of the attachment hereinafter explicitly referred to.

Similar numerals of reference designate corresponding parts in all of the views of the drawings.

The tractor 1 may be of any construction compatible with the purpose of my invention, the one illustrated being shown as having longitudinal frame bars 2 in parallelism with each other.

Superimposed on the forward portions of the bars 2 are cap plates 3 which are connected to the bars 2 through the medium of bolts 4 or other appropriate means. At 5 the said cap plates 3 are provided with raised portions on which bear the angular heads 6 of vertical screws 7 which extend downwardly from the cap plates 3 to points adjacent to the ground.

The screws 7 extend through vertically-disposed apertures with which the forward portions 5 of the cap plates 3 are provided.

Also connected by the bolts 4 to the frame bars 2 are pendent guide bars 8 on which housings 9 are adjustable vertically; the said housings 9 having threaded bores 10 receiving the screws 7, whereby rotation of the screws 7 in one direction will be attended by raising of the housings 9, and rotation of the screws 7 in the opposite direction will bring about downward movement of the housings 9. Connected by bolts 11 or other appropriate means to the housings 9 are extension bars 12, so denominated because of their adaptability to be moved endwise forwardly and rearwardly relatively to the housings 9. At 13 are braces interposed between and connected to the pendent guides 8 and the frame bars 2.

Carried at the upper sides of the forward portions of the extension bars 12 are pairs of standards 14, Figures 2, 3, 4 and 6, each pair of standards being integral with a base plate 15 and the said base plate being bolted at 16 to the adjacent extension bar 12. Arranged above the housings 9 and the extension bars 12 are the end bars 17 of a frame which is shown as a header frame; the said end bars 17 being provided with pendent rockers 18 which are arranged between and pivotally connected at 19 to the standards 14.

On the header frame is arranged a header platform 20 as well as cutting means 21, and an apron 22, the latter being trained over rollers at the ends of the platform, and one of the rollers being connectd through a universal joint 23 with a shaft section 24 which is in the form of a socket of angular form in cross section and is adapted to telescopically receive the angular forward portion of a shaft 25. Appropriately supported on the header platform is an elevator frame 26 having opposed aprons, the lower rollers of which are connected by gearing and one of which rollers is connected through a universal joint 27 with a shaft section 28 in the form of a socket of angular form in cross section and telescopically receiving the angular forward portion of a shaft 29.

Connected to and rising from the header platform 20 is a frame 30 in which is mounted a reel 31, the said reel being equipped with a miter gear 32 and being adapted to derive motion from a miter gear 33 at the forward end of a shaft 34 which is connected through a universal joint 35 with a shaft section 36 on which is a sprocket gear 37, connected through a belt 38 with a sprocket gear 39 on one of the lower shafts of the header. One of the rear upright bars of the frame 30, namely the bar 40, is extended upwardly as illustrated and serves for the connection of a rod 41, the rear end of which is connected to a hand lever 42, mounted on the rear portion of the tractor frame and equipped with a detent 43 for cooperation with a segmental rack 44.

Manifestly by manipulating the lever 42 at the rear end of the tractor 1, an attendant is enabled to advance or retract the reel.

Journaled at 50 in the cap plates 3 or other appropriate bearings is a transverse rock shaft on which are arms 51. These arms 51 are connected by rods 52 comprising turn buckles 53 to the rear ends of the bars 17. Also fixed to the rock shaft 50 is an arm 60 that is connected through a longitudinal rod 61 with a hand lever 62 mounted on the rear portion of the tractor frame; the said lever 62 being equipped with a detent 63 for cooperation with a segmental rack 64 on the tractor frame. By adjusting and adjustably fixing the lever 62, an attendant is enabled to depress or raise the header platform, and position the cutting mechanism at various distances above the ground according to different conditions.

The rotation of the vertical screws 7 for the upward and downward movement of the housings 9 may be and preferably is accomplished through the medium of wrenches applied to the angular heads 6 of the said screws.

As shown in Figures 1 and 2 the engine 70 of the tractor is provided on its drive shafts 71 with a fly wheel 72 and a gear 73, the latter being connected by appropriate gearing with shafts 74 connected through universal joints 75 with the shafts 25 and 29. By virtue of this it will be understood that the working parts of the header attachment are actuated from the engine of the tractor, and at this point I would have it understood that when apparatus other than a header is carried on the extension bars 12 and the frame bars 17, the working parts of such apparatus will be arranged so as to be driven from the engine 1.

It will be apparent from the foregoing that my novel attachment is adapted to carry an apparatus in front of the tractor in such manner that the apparatus can be bodily raised or lowered at the beginning of operation, and when the apparatus is in use the reel can be either advanced or retracted relatively to the housings 9 or can be tilted to meet different conditions as the same are encountered. It will also be apparent from the foregoing that my improvement is simple, and inexpensive in construction and is well adapted to withstand the rough usage to which apparatus-carrying attachments of tractors are ordinarily subjected.

I have entered into a detailed description of the construction and relative arrangement of parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claim.

Having described my invention, what I claim and desire to secure by Letters Patent, is:—

The combination of a tractor frame, cap plates fixed on and extending forwardly from said frame and having vertically disposed apertures, pendent vertical guides, of angular form in horizontal section, fixed to the frame, diagonal braces interposed between and connected to the lower portions of the said guides and the frame, upright screws arranged in parallelism to the guides and journaled in the apertures of the cap plates and having heads above said plates, housings guided on and extending forwardly from the pendent guides and having vertically disposed threaded bores receiving the upright screws, extension bars fixed to said housings, and bars arranged above and mounted to rock forwardly and rearwardly on the forward portions of the extension bars.

In testimony whereof I affix my signature.

CLAY O. THOMAS.